United States Patent Office 3,389,092
Patented June 18, 1968

3,389,092
PROCESS FOR PREPARING SILICA-ALUMINA
Robert A. Sanford and Marvin F. L. Johnson, Homewood, and Norman J. Williams, Harvey, Ill., assignors to Sinclair Research, Inc., New York, N.Y., a corporation of Delaware
No Drawing. Filed July 13, 1964, Ser. No. 382,381
7 Claims. (Cl. 252—430)

ABSTRACT OF THE DISCLOSURE

A process for the production of silica-alumina which consists essentially of reacting a hydroxyl-containing alumina with an organosilane having the general formula:

wherein R is an aromatic hydrocarbon group of up to 8 carbon atoms; X is halogen; and Z is selected from the group consisting of R and X.

---

The present invention is directed to a method of preparing silica-alumina useful, for instance, as a catalyst and as a support for catalytic promoting metals.

Silica-alumina is commonly used as a hydrocarbon cracking catalyst or as a support or carrier for catalytic metals such as a catalytic hydrogenation component in hydrocracking catalysts or other dual function catalysts. The source of the activity in silica-alumina catalysts is known to reside in the acidity produced by the combination of silica and alumina. Conventionally, silica-alumina is prepared by a coprecipitation process or by the addition of alumina or an aluminum salt to silica hydrogel followed by washing and calcining. Two major drawbacks in silica-aluminas prepared by these conventional processes are that they are limited insofar as the type of pore structure they are able to provide and in their ability to disperse promoters on the surfaces of the silica-alumina support.

A process has now been discovered which enables the preparation of acidic silica-alumina compositions having a wider variety of pore structures than conventional preparations. The process of the invention offers the advantage of enabling greater dispersion of catalytic promoters in the silica-alumina composition.

In accordance with the present invention a solid alumina is reacted with an organosilane having the general formula:

wherein R is a hydrocarbon group of up to 18 or more carbon atoms, preferably 1–8 carbon atoms, X is halogen and Z is selected from R and X. The resulting silica-alumina product may then be calcined and, if desired, another calcination may be conducted after washing the product to remove residual halogen. R in the general formula can be a straight or branched chain, saturated or unsaturated hydrocarbon, preferably of 1 to 8 carbon atoms. Preferably R is alkyl or phenyl and Z is either phenyl or X. R can be substituted with substituents that do not interfere with the reaction and which are not otherwise poisonous or detrimental to the catalytic function of the silica-alumina composition. Examples of non-interfering substituents are alkyl and hydroxyl groups. The halogen X in the general formula is preferably a halogen of atomic number 17 to 53, i.e., chlorine, bromine and iodine. Particularly preferred is chlorine.

Illustrative of organosilanes contemplated for use in the present invention are methyltrichlorosilane, ethyltrichlorosilane, butyltrichlorosilane, methyltribromosilane, propyltribromosilane, butyltribromosilane, methyltriiodosilane, ethyltriiodosilane, propyltriiodosilane, butyltriiodosilane, diphenyldichlorosilane, diphenyldibromosilane, dicresyldichlorosilane, di(ethylphenyl)dichlorosilane, phenyltrichlorosilane, phenyltribromosilane, phenyltriiodosilane, cresyltrichlorosilane and the like.

The alumina with which the organosilane is reacted is a solid adsorptive hydroxyl-containing alumina due to being at least slightly in a state of hydration. The alumina can be, for instance, a hydrate alumina such as amorphous hydrous alumina, alumina monohydrate, alumina trihydrate or their mixtures, or a calcined alumina such as an alumina of the gamma family. The alumina is preferably uncalcined and advantageously contains a high surface area such as a surface area of at least about 50 $m.^2/gm.$ up to 500 $m.^2/gm.$ or more as determined by the BET adsorption technique. The alumina can also contain small amounts of other solid oxides such as magnesia, natural or activated clays (such as kaolinite, montmorillonite, halloysite, etc.), titania, zirconia, etc., or their mixtures.

The reaction of the alumina and halo-organosilane can be carried out by contacting the alumina with the halosilane in the vapor phase, preferably in an inert atmosphere such as nitrogen. The reaction is conveniently carried out at ambient temperatures and atmospheric pressures but temperatures in the range of say about 0° C. to 100° C. or more and sub- and super-atmospheric pressures may be used, if desired. Alternatively, the alumina can be slurried with an inert solvent and the halosilane added to the slurry. The amount of halosilane employed in the reaction can vary depending upon the amount of silicon oxide desired in the finished silica-alumina composition. Ordinarily the amount added is that equivalent to about 0.1 to 30%, preferably about 5 to 20% $SiO_2$ based on the alumina.

The reaction product from said alumina-organosilane contacting may be subjected to a washing step when a low halogen containing product is desired. The step is only preferred, however, since it can be omitted in cases where the presence of halogen in the product is desired or not deleterious.

The washing step of the present invention, if employed, can comprise washing with water, caustic soda, ammonia, ammonium hydroxide, lower alkyl amines and other wash procedures which remove residual halide from catalysts. The drying and calcining of the silica-alumina product can also be according to conventional procedures. For example, the drying can be by heat at a temperature up to about 250° F. or more in a rotary drum drier. Calcination to an active catalyst can be effected by heating the silica-alumina at a temperature of about 750° to about 1300° F. or more, preferably in the presence of a molecular oxygen-containing gas. A dual drying calcination operation may be utilized, that is, the halosilane-alumina reaction product may be dried and calcined before the washing operation and again dried and calcined after the washing.

As previously mentioned, in addition to offering silica-alumina having a wider variety of pore structures the process of the invention provides advantages in the dispersion of catalytic promoters through the silica-alumina. For example, many catalytic metal promoters such as platinum are more highly dispersed on alumina than on silica-alumina. Thus, in accordance with the present invention advantage can be taken of alumina's greater dispersing ability by depositing the catalytic promoter on the alumina and then depositing the silica in accordance with the process of the present invention, i.e. reaction with the halosilane followed by calcining. Preferably, when a catalytic promoter is provided in this manner it is preferred to calcine the composition prior to washing in order to avoid or reduce promoter loss via washing. Then after the silica is deposited the catalyst composition is again dried and calcined. Thus the present invention contemplates the preparation of catalytically promoted silica-alumina catalysts as well as the preparation of silica-alumina. Any of promoters commonly provided silica-alumina can be used as, for instance, the hydrogenation-dehydrogenation catalytic metals of Groups IV, V, VI and VIII such as chromium, tungsten, vanadium, titanium, iron, cobalt, molybdenum, nickel, and the platinum group metals. The promoting metals can be deposited on the alumina (or silica-alumina) by various methods such as precipitation, coprecipitation, impregnation or mulling.

The following examples are included to further illustrate the present invention.

Example I

Methyltrichlorosilane vapor was introduced into a bed of alumina fluidized with dry, $CO_2$-free air by means of a stream of dry nitrogen saturated with the alkylhalosilane. The alumina employed was a dried, uncalcined $Al_2O_3$ containing about 50% boehmite with the remainder amorphous and having a surface area of 446 m.$^2$/gm. The amount of the alkylhalosilane passed through the fluidized alumina bed during the three-hour reaction time corresponded to 19 wt. percent $SiO_2$ in the final catalyst. After purging with dry air the catalyst was calcined at 900° F., washed with $NH_4OH$ to remove the chloride, dried and recalcined at 900° F. The resulting catalyst contained 4.4% $SiO_2$. This was not further tested, since the degree of reaction was less than that from solution, no doubt because of the short contact time.

Example II

Six silanes were tested by reaction in a solvent. In each case, the alumina was suspended in toluene, part of which was removed by distillation until no more adsorbed water was removed, after which the mixture was cooled to room temperature. The silane was added, in amount equivalent to 19% $SiO_2$ based on the alumina, and allowed to react overnight, with stirring. Excess silane was removed by filtration and solvent wash, after which the catalyst was dried, calcined, at 900° F., in a muffle furnace, washed with dilute ammonia, dried and re-calcined at 900° F. Results are shown in Table I. The data shows that methyltrichlorosilane (MTCS), diphenyldichlorosilane (DPDCS) and phenyltrichlorosilane (PTCS) are more reactive than the other materials and are preferred.

in the dealkylation reaction, indicative of Bronsted acidity. Past experience has indicated that the residual chloride is not responsible for this activity, which must therefore be associated with the formation of surface silica-alumina complexes.

Example III

Another catalyst was prepared from a different batch of the same type of alumina as above, in the extruded form, by reaction with methyltrichlorosilane, followed by calcination, washing with dilute ammonia, drying, and recalcining at 900° F. as before. The resulting catalyst contained 6% $SiO_2$, and less than 0.05% Cl. It was tested for isomerization of neohexane at 600° F. and a WHSV of 3.88, with nitrogen diluent at 10/1 mole ratio. Under these conditions, 95% of the neohexene was converted to isomers, whereas the untreated alumina catalyzed the reaction to only 11% under the same conditions. Again, the addition of silica produced a strong acidity.

Example IV

Another batch of catalyst was prepared in the same manner as was —9044 of Table I. It contained 11.8% $SiO_2$, <.05% Cl. It was tested in catalytic cracking of an East Texas Gas Oil at 900° F., WHSV=2, in 30-minute process periods. The following results were obtained:

| | Percent |
|---|---|
| Conversion | 60.1 |
| Gasoline | 27.4 |
| Gas | 24.8 |
| Coke | 7.9 |

It is clear that this material is an active cracking catalyst.

It is claimed:

1. A process for the production of silica-alumina which consists essentially of reacting an uncalcined alumina hydrate having a surface area of at least about 50 m.$^2$/g. with an organosilane having the general formula:

wherein R is an aromatic hydrocarbon group of up to 8 carbon atoms; X is halogen and Z is selected from the group consisting of R and X, said reacting being carried out by contacting the uncalcined alumina hydrate with the silane as a solution in an inert liquid hydrocarbon solvent.

2. The process of claim 1 wherein the resulting silica-alumina product is washed to remove residual halogen and calcined to an active catalytic state.

3. The process of claim 1 wherein the hydrocarbon group is a phenyl group and Z is selected from a group consisting of a phenyl group and halogen.

TABLE I.—ALUMINA+SILICA PREPARATIONS

| Final Sample No. | Silane Used | Percent SiO$_2$ Dried Before Washing | Final Catalyst, Percent | | TBB Dealkylation Rate* |
|---|---|---|---|---|---|
| | | | SiO$_2$ | Cl | |
| —9101 | None | | | | 0 |
| —9988 | Trimethylchlorosilane (TMCS) | 0.7 | 1.4 | 0.33 | 0.001 |
| —9038 | Dimethyldichlorosilane (DMDCS) | 0.8 | | | |
| —9044 | Methyltrichlorosilane (MTCS) | 12.4 | 16.0 | 0.29 | 0.0029 |
| —9045 | Diphenyldichlorosilane (DPDCS) | 10.2 | 13.9 | 0.16 | 0.035 |
| —9046 | Phenyltrichlorosilane (PTCS) | 10.2 | 11.7 | 0.06 | 0.039 |

*Meq./gm./sec. at 400° C.

The acidities of the resulting silica-alumina catalysts were established by measuring the rate of dealkylation of tertiarybutylbenzene (TBB) over the catalysts in a differential reactor similar to the method of Johnson and Melik reported in the Journal of Physical Chemistry, 65, 1146 (1961). The TBB dealkylation rates listed in Table I were calculated by analyzing the reactor effluent by gas chromatography. As can be seen from Table I, catalysts containing 11 to 16 percent silica were most active 4. The process of claim 1 wherein the silane is diphenyldichlorosilane.

5. The process of claim 1 wherein the silane is phenyltrichlorosilane.

6. A process for the production of an acidic silica-alumina catalytic composition which comprises reacting, within the range of about 0° C. to 100° C., an uncalcined alumina hydrate having a surface area of at least about 50 m.$^2$/g. with a halosilane selected from the group consisting of diphenyldichlorosilane, diphenyldibromosilane, dicresyldichlorosilane, diethylphenyldichlorosilane, phenyltrichlorosilane, phenyltribromosilane, phenyltriiodosilane and cresyltrichlorosilane, said reacting being carried out by contacting the uncalcined alumina hydrate with the silane as a solution in an inert liquid hydrocarbon solvent, and calcining the resulting silica-alumina reaction product within the range of about 750° to about 1300° F. thereby forming an active silica-alumina catalytic composition.

7. A process for the production of an acidic silica-alumina catalytic composition as set forth in claim 6 wherein a catalytic promoter is deposited on said alumina prior to reacting with said halosilane.

References Cited
UNITED STATES PATENTS

| | | | |
|---|---|---|---|
| 3,207,699 | 9/1965 | Harding et al. | 252—430 |
| 3,213,156 | 10/1965 | Harding et al. | |
| 3,277,135 | 10/1966 | Harding et al. | 252—430 X |

DANIEL S. WYMAN, *Primary Examiner.*

C. F. DEES, *Assistant Examiner.*